United States Patent [19]
Yasui

[11] Patent Number: 5,311,695
[45] Date of Patent: May 17, 1994

[54] FISHING ROD HAVING LINE GUIDES, AND METHOD OF MANUFACTURING SAME

[75] Inventor: Toshihiko Yasui, Tondabayashi, Japan

[73] Assignee: Shimano Inc., Osaka, Japan

[21] Appl. No.: 2,658

[22] Filed: Jan. 11, 1993

[30] Foreign Application Priority Data

Jan. 17, 1992 [JP] Japan .................. 4-006062

[51] Int. Cl.$^5$ .................................. A01K 87/04
[52] U.S. Cl. .................................. 43/24
[58] Field of Search .......... 43/24, 18.1; 29/450, 29/525

[56] References Cited

U.S. PATENT DOCUMENTS

| | | | |
|---|---|---|---|
| 931,277 | 8/1909 | Crane | 43/24 |
| 3,063,186 | 11/1962 | Ward | 43/24 |
| 4,051,618 | 10/1977 | Ohmura | 43/24 |
| 4,080,748 | 3/1978 | Ohmura | 43/24 |
| 4,445,293 | 5/1984 | Ohmura | 43/24 |

FOREIGN PATENT DOCUMENTS

| | | | |
|---|---|---|---|
| 2263686 | 10/1975 | France | 43/24 |
| 2-23144 | 5/1990 | Japan . | |
| 2250413 | 6/1992 | United Kingdom | 43/24 |

*Primary Examiner*—Kurt C. Rowan
*Attorney, Agent, or Firm*—Dickstein, Shapiro & Morin

[57] ABSTRACT

A fishing rod has rod stock, and fixed guides formed on the rod stock. Each guide includes an annular line guide element formed of a material having excellent wear resistance, a tubular element mounted on the rod stock, a frame formed integral with the tubular element for supporting the line guide element, and a pair of sleeves mounted on the rod stock. The sleeves are arranged axially of the rod stock with the tubular element placed in between. Each sleeve defines an outer surface having an arcuate sectional shape gently tapered to approach an outer surface of the rod stock as it extends away from the tubular element.

8 Claims, 4 Drawing Sheets

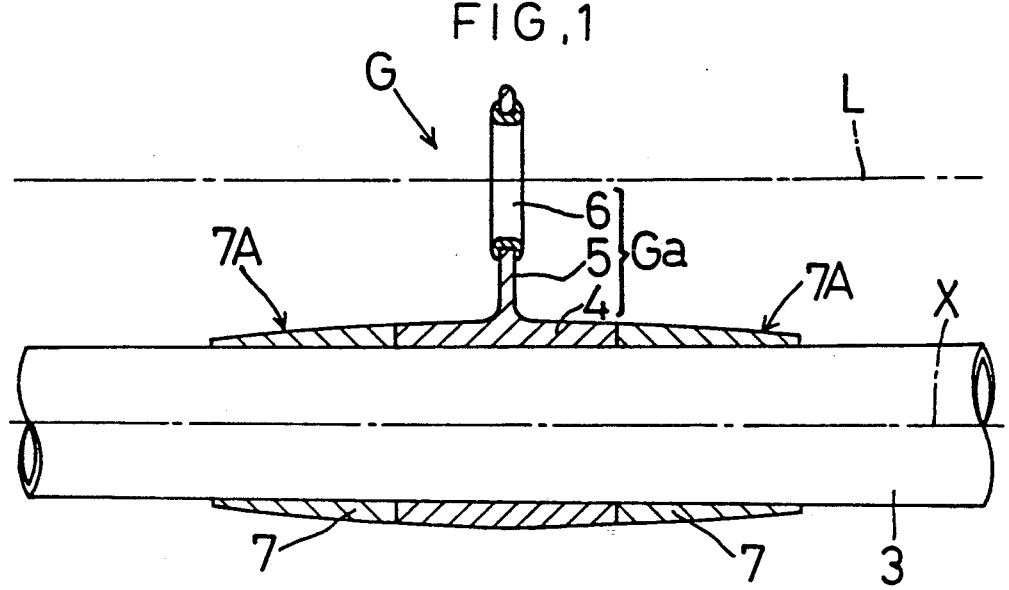
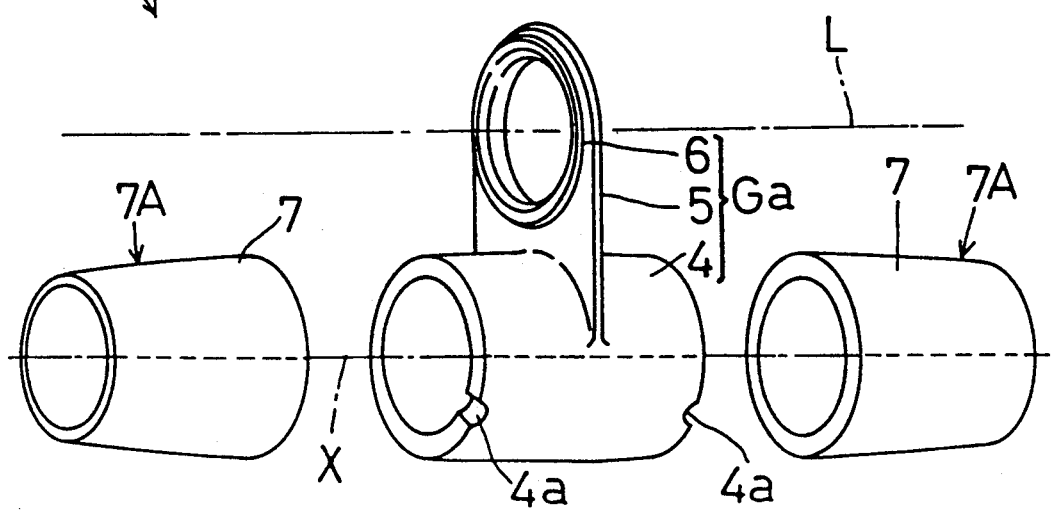

FISHING ROD HAVING LINE GUIDES, AND METHOD OF MANUFACTURING SAME

BACKGROUND OF THE INVENTION

1. Field of the Invention

This invention relates to a fishing rod and to a method of manufacturing the fishing rod. More particularly, the invention relates to a technique of forming fixed guides on rod stock of a fishing rod.

2. Description of the Related Art

A known technique of forming fixed guides on rod stock is disclosed in Japanese Patent Publication No. 2-23144, for example. According to this technique, each guide includes a ring for guiding a fishing line, and a pair of legs. The guide is attached to the rod stock, with the legs thereof tied to the rod stock by string.

With this type of fixed guide, usually, a resin is applied over outer surfaces of the string wound around the legs to protect the string and to prevent the string from becoming loose.

In the prior construction noted above, the string wound around the legs to fasten the legs to a side wall of the rod stock bulges from the rod stock. The fishing line tends to become entangled on the bulges. Further, since the legs are placed in contact with a side wall of the rod stock, the fishing rod has increased rigidity locally, i.e. in positions of contact with the legs. Consequently, the rod has varied rigidity in the circumferential direction, and the condition of the rod is variable depending on bending directions thereof.

The condition of the rod is greatly variable with bending directions in the case of a lure rod, for example, which is relatively short but has numerous fixed guides. When the angler attempts to securely hook a fish after perceiving a strike or when tension of the fishing line changes rapidly in the course of fighting a fish, it is impossible to maintain the fishing line in proper tension, and this could result in escape of the fish. Thus, there is room for improvement.

As noted above, the legs of each guide are securely tied to the conventional fishing rod by means of string. Manufacture of such fishing rod involves an irksome operation of winding the string around the legs. Further, it is difficult to arrange a plurality of guides in a predetermined orientation and linearly along the axis of the rod stock. Any deviation from this arrangement results in a deterioration in line guiding performance. There is room for improvement in this respect also.

SUMMARY OF THE INVENTION

A primary object of the present invention is to provide a fishing rod the condition of which is not easily changeable regardless of bending directions thereof, which effectively avoids entanglement of a fishing line on a fixed guide or guides, and which allows the fixed guide or guides to be formed thereon in a desired posture with ease.

Another object of the invention is to provide an improved method of manufacturing such a fishing rod.

The above primary object is fulfilled, according to the present invention, by a fishing rod comprising rod stock and a fixed guide or guides wherein the/each fixed guide includes an annular line guide element supported by a frame formed integral with a tubular element mounted on the rod stock, and a pair of sleeves mounted on the rod stock, the sleeves being arranged axially of the rod stock with the tubular element placed in between.

This construction has the following functions and effects.

The above features may be arranged as shown in FIGS. 1 and 2, for example. The tubular element 4 surrounds an entire circumference of rod stock 3, so that the rod has uniform flexural rigidity circumferentially of the position having the tubular element 4. Since the tubular element 4 is placed between the sleeves 7, the tubular element 4 is not displaceable axially of the rod stock 3 against an external force. The tubular element 4 surrounding the entire circumference of the rod stock 3 does not form a local bulge. Positions of level difference between the tubular element 4 and rod stock 3 may be filled by the sleeves 7.

In another aspect of the present invention, a method of manufacturing a fishing rod is provided, which comprises the steps of forming a guide having an annular line guide element supported by a frame formed integral with a tubular element, fitting the tubular element on rod stock, fitting a pair of sleeves on the rod stock to sandwich the tubular element therebetween in the direction of an axis of the rod stock, and fixing the tubular element and the sleeves to the rod stock.

This method has the following functions and effects.

As shown in FIGS. 1 and 2, the fishing rod is manufactured by fitting the tubular element 4 on the rod stock 3, arranging the sleeves 7 to sandwich the tubular element 4 therebetween, and fixing the tubular element 4 and sleeves 7 to the rod stock 3.

As distinct from the prior art, the fixed guide G may be formed without using string to tie the guide. Where the tubular element 4 is fixed by an adhesive, position of the tubular element 4 and orientation around the rod stock 3 of the tubular element 4 are changeable after fitting the tubular element 4 on the rod stock 3 and before the adhesive hardens completely. Consequently, the line guide element 6 is positionally adjustable, and where a plurality of fixed guides G are provided on the rod, the guides G may be set to desired positions relative to one another.

Compared with the prior art in which the legs of a guide extending axially of the rod are fixedly tied to the rod with string, the present invention provides a fishing rod, and a method of manufacturing the fishing rod, which eliminates the bulges due to the legs of the guide, the condition of which is not easily changeable regardless of bending directions of the rod, which effectively avoids entanglement of a fishing line on the fixed guides, and which allows the fixed guides to be formed thereon in a desired posture with ease.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 1 is a side view in vertical section of a fixed guide,

FIG. 2 is an exploded perspective view of the fixed guide,

DETAILED DESCRIPTION OF THE PREFERRED EMBODIMENTS

A fishing rod according to the present invention will particularly be described with reference to the drawings.

Figure 3:
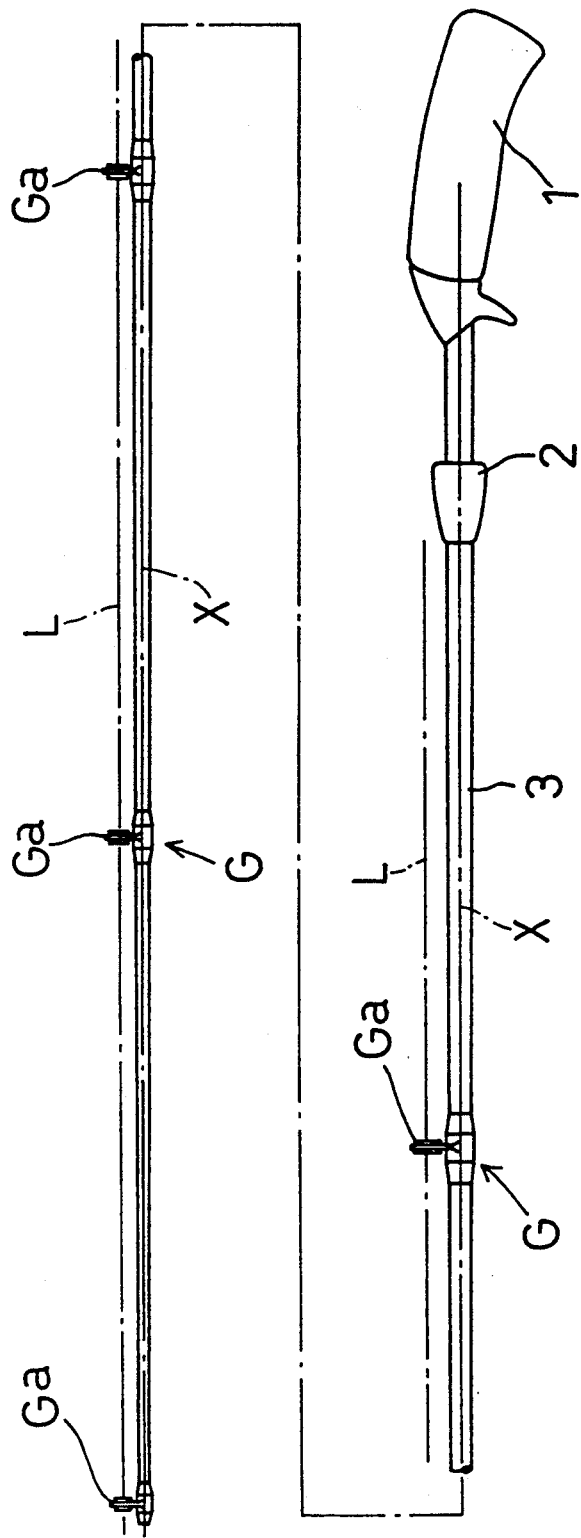
FIG. 3 is a side view of a lure rod.

FIG. 3 shows a lure rod which is one type of fishing rod. This rod includes a plastic grip 1, a reel seat 2 having a reel (not shown), rod stock 3 formed of a plastic reinforced with a high strength fiber such as carbon fiber, and a plurality of fixed guides G formed on the rod stock 3.

A guide Ga includes a tubular element 4 fixedly mounted on the rod stock 3, a frame 5 formed integral with the tubular element 4, and a line guide element 6 supported by the frame 5. A pair of plastic sleeves 7 are arranged along an axis X of the rod stock 3 with the tubular element 4 placed therebetween. These sleeves 7 and guide Ga constitute each of the fixed guides G.

The tubular element 4 is formed of plastic, while the frame 5 is formed of metal. The tubular element 4 and frame 5 are joined to have smoothly continuous surfaces. The tubular element 4 has an inside diameter matching an outside diameter of the rod stock 3.

The line guide element 6 has an annular shape and is formed of a material having excellent wear resistance, such as ceramic. The frame 5 is in plate-like form and lies in a plane perpendicular to the axis X. The end of each sleeve 7 opposed to the tubular element 4 has a thickness equal to that of the tubular element 4. Each sleeve 7 defines an outer surface having an arcuate sectional shape gently tapered to approach an outer surface of the rod stock 3 as it extends along the axis X away from the tubular element 4.

The fixed guides G are formed on the rod stock 3 by the following method. An adhesive is applied to inner peripheral walls of the tubular elements 4 and sleeves 7. The guides G are successively passed along the rod stock 3 to predetermined positions thereon. Next, the guides G are adjusted to a proper orientation or position before the adhesive hardens, so that the center of each line guide element 6 is aligned to a line guide path L. In this state, the adhesive is allowed to harden, whereby the fixed guides G are arranged linearly. The tubular element 4 of each fixed guide G has an outer surface smoothly continuous with the outer surface of the rod stock 3 through the outer surfaces of the sleeves 7. Subsequently, a predetermined surface treatment, such as painting, is carried out to complete the fishing rod.

As shown in FIG. 2, the tubular element 4 of each guide Ga has recesses 4a formed in opposite end edges thereof. The adhesive flows into these recesses 4a to prevent rotation of the tubular element 4.

Other embodiments will be described next.

Figure 4:
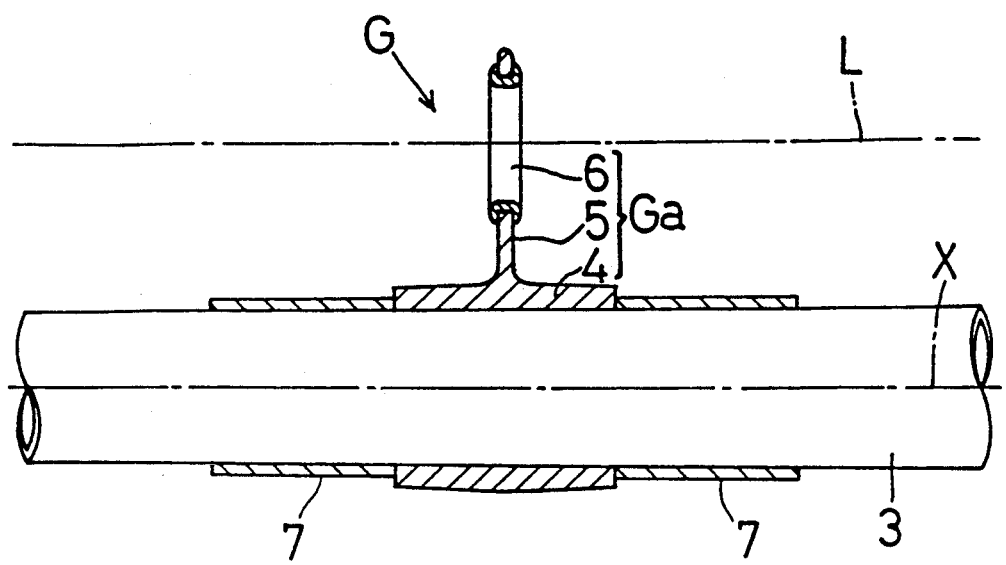
FIG. 4 is a side view in vertical section of a fixed guide in another embodiment of the invention.

As shown in FIG. 4, the sleeves 7 may have a thickness different from the thickness of the tubular element 4. For example, the sleeves 7 may be half as thick as the tubular element 4, and may have outer surfaces not formed into a tapered shape.

Figure 5:
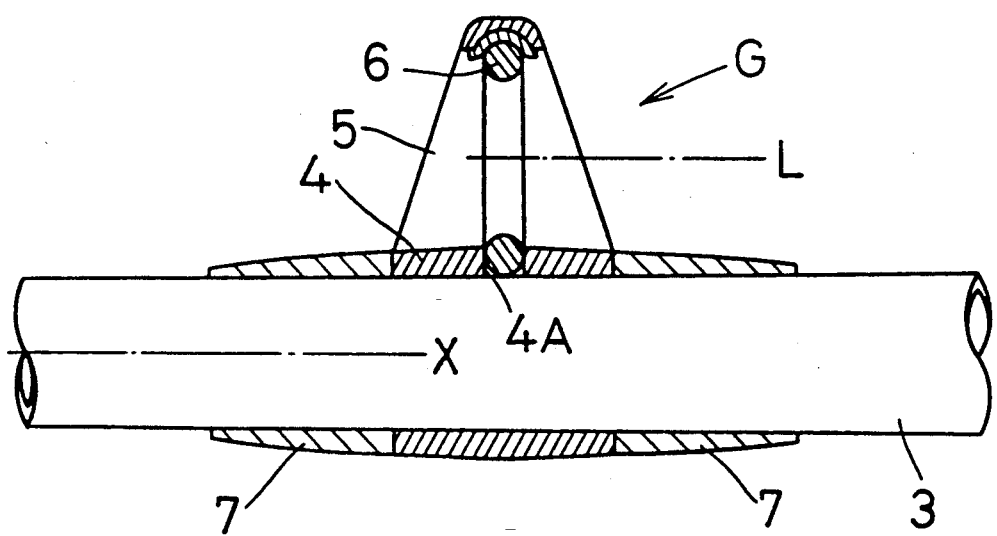
FIG. 5 is a side view in vertical section of a fixed guide in a further embodiment of the invention.

FIG. 5 shows an embodiment in which an opening 4A is formed in a side wall of the tubular element 4 to receive the line guide element 6. A frame 5 shaped to embrace outer peripheries of the line guide element 6 is formed integral with the tubular element 4. This guide G is then securely fitted on the rod stock 3, and the sleeves 7 are fitted in place to sandwich the tubular element 4 therebetween in the direction of axis X.

With the fixed guide G formed as above, the rod stock 3 and line guide element 6 contact each other. In an actual fishing situation, vibrations of the fishing line are transmitted to the rod stock 3 through the line guide element 6. This helps the angler to determine fish strikes with ease.

The frame 5 of this fixed guide G has a trapezoidal shape with a fore and aft width diminishing away from the rod stock 3. This configuration is effective to prevent the fishing line from becoming entangled on the frame 5.

Figure 6:
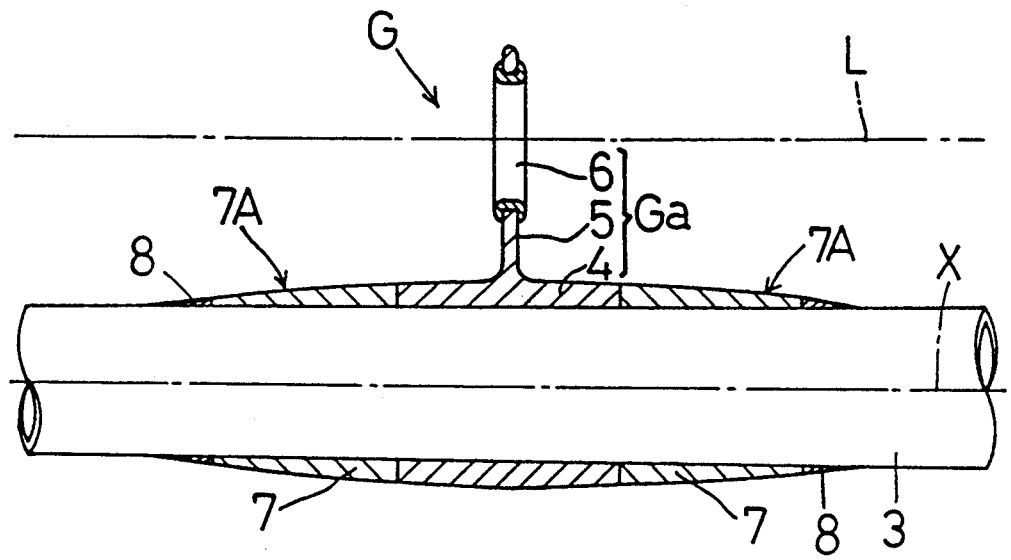
FIG. 6 is a side view in vertical section of a fixed guide in a still further embodiment of the invention.

FIG. 6 shows a further embodiment in which, as in FIG. 1, a guide Ga includes a tubular element 4 fixedly mounted on the rod stock 3, a frame 5 formed on the tubular element 4, and a line guide element 6 supported by the frame 5. A pair of plastic sleeves 7 are arranged along the axis X of the rod stock 3 with the tubular element 4 placed therebetween. These sleeves 7 and guide Ga constitute each of the fixed guides G.

The tubular element 4 and sleeves 7 are shaped to define smoothly continuous outer surfaces. A resin 8 is placed to fill a difference in level between an end of each sleeve 7 and the outer surface of the rod stock 3. Consequently, a smooth outer surface is formed between the end of each sleeve 7 and the outer surface of the rod stock 3 to effectively prevent entanglement of the fishing line.

Figure 7:
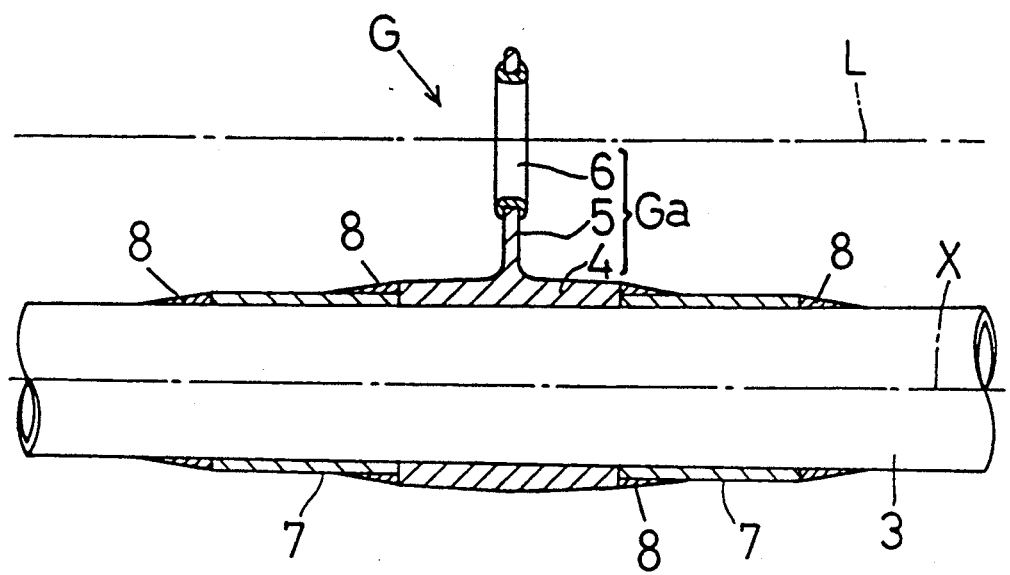
FIG. 7 is a side view in vertical section of a fixed guide in a still further embodiment of the invention.

FIG. 7 shows a still further embodiment in which, as in FIG. 4, the sleeves 7 have half the thickness of the tubular element 4. The sleeves 7 are arranged along the axis X of the rod stock 3 with the tubular element 4 placed therebetween. A resin 8 is placed to fill a difference in level between an end of each sleeve 7 and an end of the tubular element 4 and a difference in level between the other end of each sleeve 7 and the outer surface of the rod stock 3. Consequently, smooth outer surfaces are formed in these positions to effectively prevent entanglement of the fishing line.

According to the present invention, the sleeves may be formed of a heat contractible plastic. Such sleeves may be fixed to the outer surface of the rod stock through contraction by heat supply, without using an adhesive. The tubular element and frame may also be formed of plastic to be integral with each other.

The rod stock may be knurled to define rugged surfaces where the guides are formed, to prevent rotation of the guides with greater assurance.

The tubular element may define uneven end surfaces, with the sleeves also defining uneven end surfaces for engaging the ends surfaces of the tubular element. With this structure, the guide is held against rotation by using the rotation stopping function of the sleeves.

What is claimed is:

1. A fishing rod comprising:
   rod stock; and
   fixed guide means including
   a line guide element having an annular shape and formed of a material having wear resistance,
   a tubular element mounted on said rod stock,
   a frame formed integral with said tubular element for supporting said line guide element, and
   a pair of sleeves having a tubular shape for mounting on said rod stock, said sleeves being arranged axially of said rod stock with said tubular element placed in between;

each of said sleeves defines an outer surface having an arcuate sectional shape gently tapered to approach an outer surface of said rod stock as said outer surface extends away from said tubular element.

2. A fishing rod as defined in claim 1, wherein said frame has a plate-like shape and is formed on said tubular element and in a plane perpendicular to an axis of said rod stock.

3. A fishing rod as defined in claim 1, wherein said sleeves have a smaller wall thickness than said tubular element.

4. A fishing rod as defined in claim 1, further comprising resin layers for filling level differences between said tubular element and said rod stock to form smooth surfaces between outer surfaces of said tubular element and said rod stock.

5. A fishing rod as defined in claim 1, wherein said tubular element and said sleeves are fixed to said rod stock by an adhesive.

6. A fishing rod as defined in claim 1, wherein said rod stock is in form of a tubular plastic object reinforced with a high strength fiber such as glass fiber or carbon fiber.

7. A method of manufacturing a fishing rod comprising the steps of:
   fitting a tubular element having a line guide element on rod stock;
   fitting a pair sleeves on said rod stock to sandwich said tubular element therebetween in the direction of an axis of said rod stock, each of said sleeves defining an outer surface having an arcuate sectional shape gently tapered to approach an outer surface of said rod stock as said outer surface extends away from said tubular element; and
   fixing said tubular element and said sleeves to said rod stock.

8. A method as defined in claim 7, wherein said tubular element and said sleeves are fixed to said rod stock by an adhesive.

* * * * *